(12) United States Patent
Deng et al.

(10) Patent No.: US 10,257,352 B2
(45) Date of Patent: *Apr. 9, 2019

(54) END USER EXPERIENCE VIA DISTRIBUTED OPTION TREE GENERATION

(71) Applicant: INTERNATIONAL BUSINESS MACHINES CORPORATION, Armonk, NY (US)

(72) Inventors: Jiangang Deng, Beijing (CN); Chao Li, Beijing (CN); He Lei Liu, Beijing (CN); Qing Yu Pei, Beijing (CN); Heng Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/446,020

(22) Filed: Mar. 1, 2017

(65) Prior Publication Data

US 2018/0255178 A1  Sep. 6, 2018

(51) Int. Cl.
*H04M 11/00* (2006.01)
*H04M 3/493* (2006.01)
*H04M 1/64* (2006.01)

(52) U.S. Cl.
CPC ...... *H04M 3/493* (2013.01); *H04M 2203/355* (2013.01)

(58) Field of Classification Search
CPC ... H04M 2203/2061; H04M 2203/254; H04M 2203/558; H04M 3/42068; H04M 3/493

(Continued)

(56) References Cited

U.S. PATENT DOCUMENTS 6,560,320 B1  5/2003 Paleiov et al.
6,920,425 B1  7/2005 Will et al.
(Continued)

FOREIGN PATENT DOCUMENTS

CN  103118206 A  5/2013
WO  2009079252 A1  6/2009

OTHER PUBLICATIONS

Yin et al., "Dial and See—Tackling the Voice Menu Navigation Problem with Cross-Device User Experience Integration," Proceedings of the 18th Annual ACM Symposium on User Interface Software and Technology, Oct. 3-27, 2005, Seattle, Washington, USA, Copyright, 2005, ACM (Best date available), pp. 187-190.

(Continued)

*Primary Examiner* — Solomon G Bezuayehu
(74) *Attorney, Agent, or Firm* — Michael O'Keefe

(57) ABSTRACT

A method, computer program product, and system is disclosed for generating an Interactive Voice Response (IVR) system tree. A plurality of IVR system options from the IVR system are received. A first set of selections of the IVR system options are received from the user. A second set of selections of the IVR system are received, comprising at least a second set of subtrees. In response to identifying a plurality of subtrees of the second set of subtrees that are associated with the root node, the identified plurality of subtrees are mapped to the option tree. An IVR combination tree is generated. A visualization IVR combination tree is generated for display, in response to receiving a second user request for access to the IVR system. A target service associated with a user input selection of at least one end node of the visualized IVR combination tree is accessed.

14 Claims, 6 Drawing Sheets

(58) Field of Classification Search
USPC .......................................... 379/88.01–88.19
See application file for complete search history.

(56) References Cited

U.S. PATENT DOCUMENTS

| | | |
|---|---|---|
| 7,065,188 B1 | 6/2006 | Mei et al. |
| 7,215,743 B2 | 5/2007 | Creamer et al. |
| 7,783,305 B2 | 8/2010 | Ross et al. |
| 8,175,651 B2 | 5/2012 | Rios et al. |
| 8,265,234 B2 | 9/2012 | Singh |
| 8,717,915 B2 | 5/2014 | Dubut et al. |
| 9,001,819 B1 | 4/2015 | Or-Bach et al. |
| 9,413,888 B2 | 8/2016 | Engstrom |
| 9,456,324 B2 | 9/2016 | Rotsztein et al. |
| 2007/0133759 A1* | 6/2007 | Malik .................. H04M 3/493 379/80 |
| 2008/0066015 A1 | 3/2008 | Blankenhorn |
| 2012/0008755 A1 | 1/2012 | Mittal |
| 2012/0140905 A1 | 6/2012 | Awad et al. |
| 2013/0094633 A1 | 4/2013 | Mauro |
| 2014/0161240 A1* | 6/2014 | Chau ................ H04M 3/42008 379/114.05 |
| 2015/0010136 A1* | 1/2015 | Lavian ................ H04M 3/493 379/88.11 |
| 2015/0023484 A1* | 1/2015 | Ni ...................... H04M 3/5166 379/88.18 |

OTHER PUBLICATIONS

IBM: List of IBM Patents or Patent Applications Treated as Related (Appendix P), Jan. 16, 2018, 2 pages.
Pending U.S. Appl. No. 15/723,247, filed Oct. 3, 2017, entitled: "End User Experience Via Distributed Option Tree Generation", 31 pages.

\* cited by examiner

END USER EXPERIENCE VIA DISTRIBUTED OPTION TREE GENERATION

BACKGROUND

The present invention relates generally to the field of Interactive Voice Response (IVR) menu navigation, and more particularly to generating IVR menu trees through combinations of multiple user interactions.

Short for Interactive Voice Response, IVR is a computerized phone system that enables a person, typically a telephone caller, to make a selection from a voice menu. The selection is made using touchphone keypad entries or voice responses. IVR system are widely used by various organizations, such as banks, insurance companies, and other service providers to manage calls from customers. With IVR systems, the service providers allow users to access various selections, or target services, simultaneously reduces the cost of providing the services through electronic menu options.

Generally, in an IVR system when a caller calls in, an automated audio menu is played. The audio menu contains instructions to provide instant services such as, for example, an account balance inquiry where a banking menu is accessed and the target service of the account balance information is obtained. The menu may also provide guided options for the caller to select in order to connect to the target services within the system. For example, the menu may direct the caller to press various keys on a telephone to connect to a particular department or agent. Thus the IVR menu may be modeled with associated options to the target services, such as the type of departments, type of services, customer care executives and/or agents.

SUMMARY

Embodiments of the present invention disclose a method, computer program product, and system for generating an Interactive Voice Response (IVR) system tree in which a user request for access to an IVR system is received by a server. In response to receiving a plurality of IVR system options from the IVR system, a plurality of IVR system options are communicated to the user, wherein the IVR system options include an category option and a plurality of target service options associated with the access request. A first set of selections of the IVR system options are received from the user, wherein the IVR system options comprise an option tree, an option tree includes at least a root node, a set of subtrees associated with the root node, and an end node associated with a target service option of the plurality of target service options. A second set of selections of the IVR system are received, comprising at least a second set of subtrees. In response to identifying a plurality of subtrees of the second set of subtrees that are associated with the root node, the identified plurality of subtrees are mapped to the option tree. An IVR combination tree is generated, wherein the generated IVR combination tree comprises at one or more of the first set of subtrees and identified plurality of subtrees. A visualization IVR combination tree is generated for display, in response to receiving a second user request for access to the IVR system. A target service associated with a user input selection of at least one end node of the visualized IVR combination tree is accessed.

DETAILED DESCRIPTION

Figure 1:
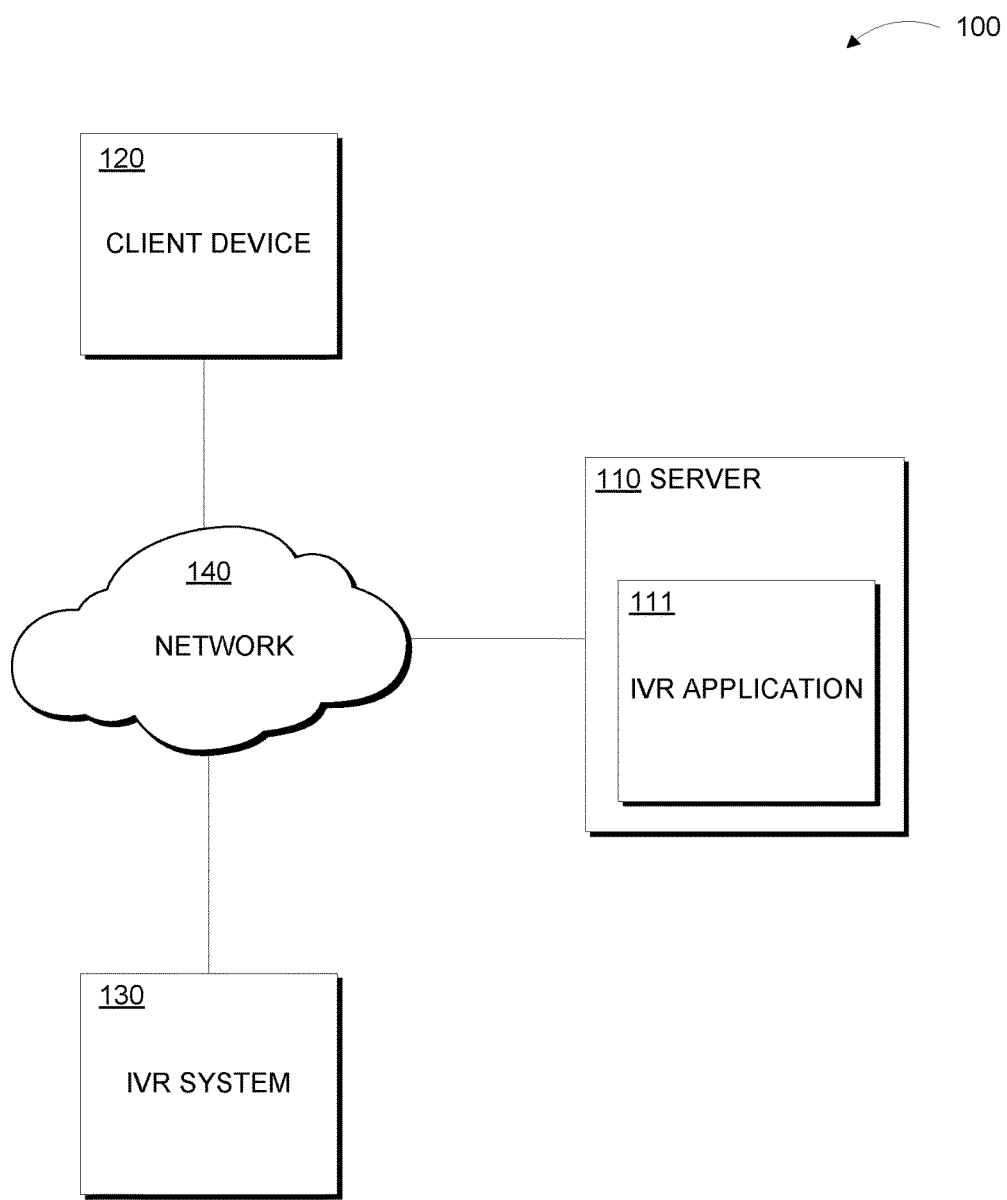
FIG. 1 is a functional block diagram illustrating a distributed data processing environment, in accordance with an embodiment of the present invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

In typical IVR systems, the caller requesting a target service or destination may have to listen and follow instructions through the menu of the system to achieve a desired response, perform a given function, or provide a target service. This process may be time consuming. Additionally, instances of incorrect input by the user may necessitate additional menu navigation or exiting and restarting the system. Various changes to target services may necessitate updates to the IVR menu. For example, extension numbers inside an organization may be changed and correspondingly, the extension numbers associated with the IVR menu may be updated. As a result, a frequent caller may not be able to reach a desired target service by remembering a combination of numbers, or menu selection inputs.

Moreover, in various systems where a mobile device is the access point, a caller or user, may need to actuate many telephone keys to indicate the desired target service and may require additional inputs for confirmations of selections. Mobile devices may require the device to change position from the user's ear in order to access the input, for example, a keypad, and repeat the process for each required input. It may be advantageous to display IVR trees or target services directly to the user without the need for vocal instructions.

IVR tree generation through various methods known in the art may aid in users in navigating to the desired option. One method of IVR tree generation is to use a telephone number to traverse the whole IVR, then convert the voice into an IVR tree. For example, if there are 5000 IVR numbers, the IVR system may need to accessed 5000 times. Where cost and time are accrued for each phone call. It may be advantageous to the field of IVR tree generation where a distributed method is used to generate an IVR tree automatically using voice recognition technology. In the IVR tree, the main IVR menu may be represented as a root node and the target services may be represented as the leaf nodes. "Hot Services" may also be advantageous to mitigate inefficiencies inherent in an IVR system.

In various embodiments of the present invention, a method, computer program product, and system are provided for generating an IVR system tree. A user request for access to an IVR system is received. In response to receiving a plurality of IVR system options from the IVR system, the plurality of IVR system options is communicated to a user, wherein the IVR system options include a category option and a plurality of target service options associated with the access request. A first set of selections of the IVR system options is received from the user. The IVR system options include an option tree, an option tree includes at least a root node, a set of subtrees associated with the root node, and an end node associated with a target service option of the plurality of target service options.

In various embodiments a second set of selections of the IVR system is received comprising at least a second set of subtrees. In response to identifying a plurality of subtrees of the second set of subtrees that are associated with the root node, the identified plurality of subtrees are mapped to the option tree. An IVR combination tree is generated, wherein the generated IVR combination tree includes at one or more of the first set of subtrees and identified plurality of subtrees. A visualization of the IVR combination tree is generated for display, in response to receiving a second user request for access to the IVR system. Therefore, a target service associated with a user input selection of at least one end node of the visualized IVR combination tree is accessed.

As mentioned above, a first set of selections is received. In various embodiments, received selections further includes one or more of vocal selection and touchpad user inputs selection. In various embodiments, a target selections using voice recognition is received. The received target selections is displayed. One or more target selections are displayed. One or more target selections based on a count above a threshold is displayed.

In various embodiments, in response to receiving authentication metadata associated with a user profile, one or more target services are displayed, based on the received metadata.

In various embodiments, a third set of selections of the IVR system comprising at least a third set of subtrees is received. In response to dynamically determining one or more selections of the third set of selections of the IVR tree do not match selections of the generated IVR combination tree, an updated IVR combination tree is generated based on the determined one or more selections and generated IVR combination tree.

In additional embodiments, an access count value of each target services accessed by a user is determined. The target services are ordered based on the associated access count value. The target services with a count above a threshold are displayed.

In various embodiments, a user calls the IVR service, the user interacts with the IVR system going through one or more options to reach a target service. In various embodiments of the present invention, one or more subtrees are generated (using voice recognition) to determine the path the user took to the target service. The plurality of subtrees, which are generated through plurality of callers, are combined into an IVR tree. When the user initiates a second call, a visualization of the total IVR tree is displayed. In response to user selection of a displayed option or target service, the server executes the IVR tree to reach the target service.

The present invention will now be described in detail with reference to the Figures. FIG. 1 is a functional block diagram illustrating a distributed data processing environment, generally designated 100, in accordance with one embodiment of the present invention.

Distributed data processing environment 100 includes server 110, client device 120, and IVR system 130, all interconnected over network 140.

Server 110, client device 120 and IVR system 130 may be a laptop computer, tablet computer, netbook computer, personal computer (PC), a desktop computer, a smart phone, or any programmable electronic device capable of communicating with server 110, client devices 120 and IVR system 130 via network 140.

Server 110 includes IVR application 111. IVR Application 111 may operate generally to receive options from IVR system 130 via server 110, receive user selections and target service requests from client device 120, generate IVR trees and IVR combinations trees based on multiple IVR trees, and display visualizations of generated IVR trees. Server 110 may include internal and external hardware components, as depicted and described in further detail with respect to FIG. 6.

IVR application 111 may receive a plurality of IVR system options from IVR system 130. Received IVR options may be organized as any IVR system known in the art. IVR application 111 may receive a user input from client device 120. The user input may include one or more IVR option selection from the plurality of IVR system options. IVR application 111 may generate an IVR tree based on the received one or more IVR option selections. IVR application 111 may save the generated tree in a data store in memory. If there are previously generated IVR trees in memory, IVR application 111 may compare one or more saved IVR trees and identify unique option selections. Unique option selections may indicate a change or addition to the IVR system. IVR application 111 may generate an IVR combination tree comprising of all the generated IVR trees. The comparison of generated IVR trees in memory may occur at any predetermined interval or every time options are received. In various embodiments, after a number of users interact with IVR application 111, the generated IVR combination tree with encompass all possible options provided by IVR system 130. Changes in IVR system 130 may be reflected in subsequently received option selections and IVR application 111 may generate an updated IVR combination tree. IVR application 111 may generate IVR trees and/or IVR combination trees for display to a user or in response to a user requesting a target service.

Network 140 can be, for example, a local area network (LAN), a wide area network (WAN) such as the Internet, or a combination of the two, and can include wired, wireless, or fiber optic connections. In general, network 140 can be any combination of connections and protocols that will support communications between server 110 and client device 120500.

Figure 2:
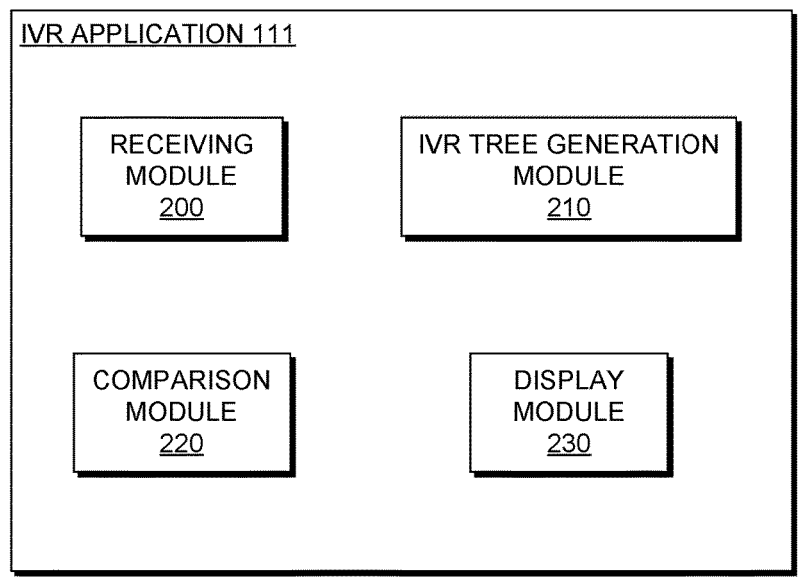
FIG. 2 is a functional block diagram illustrating the components of an application within the distributed data processing environment, in accordance with an embodiment of the present invention.

FIG. 2 is a functional block diagram illustrating the components of an IVR application 111 within the distributed data processing environment 100, in accordance with an embodiment of the present invention. IVR application 111 includes receiving module 200, IVR tree generation module 210, comparison module 220, and display module 230. Receiving module 200 may operate generally to receive IVR system options, option selections, target services, and receive communications from client device 120 via network 140. Receiving module 200 may communicate option selections to IVR tree generation module 210 via IVR application 111.

Figure 4A:
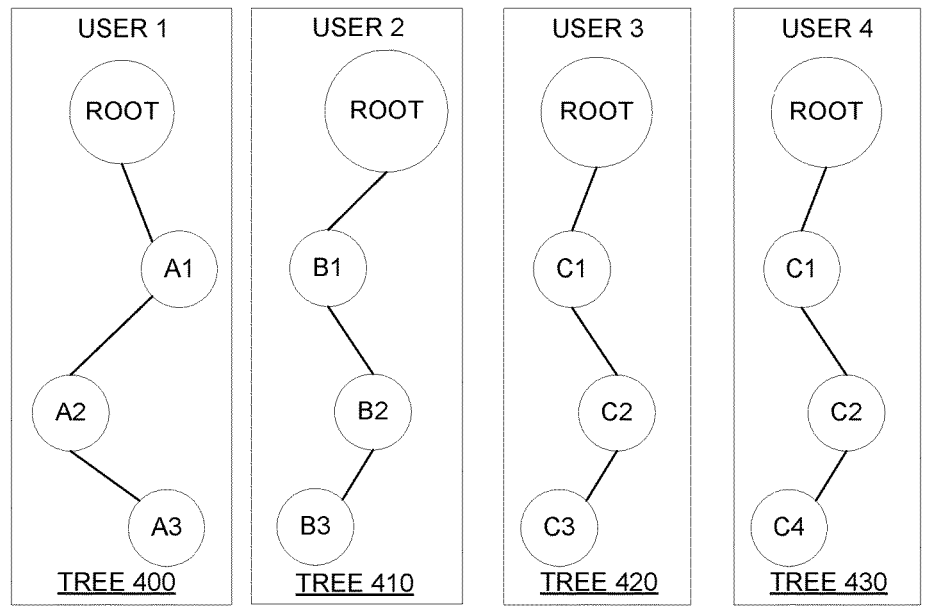
FIG. 4A and FIG. 4B are block diagrams depicting generating a combination IVR tree.
Figure 4B:
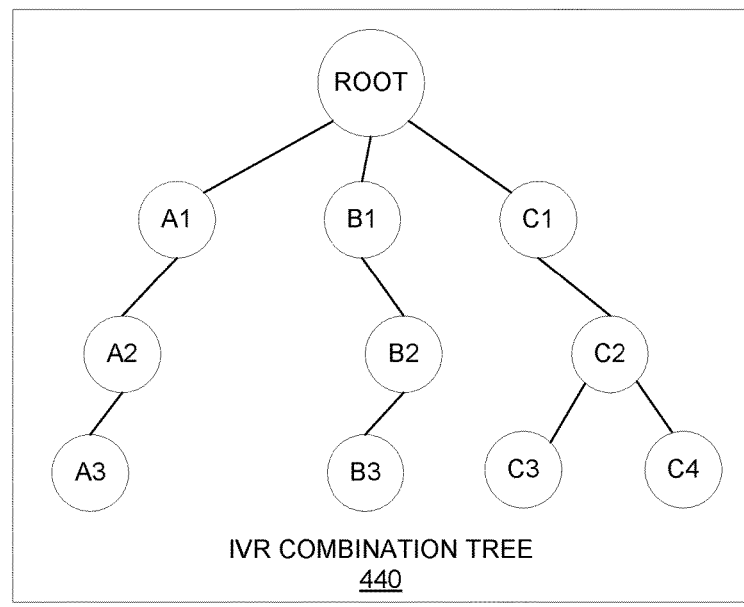

IVR tree generation module 210 may operate generally to receive option selections from receiving module 200 via IVR application 111 and generate IVR trees based on the received option selections as further described in FIG. 4A and FIG. 4B. IVR tree generation module 210 may generate IVR trees using any known method in the art for using voice recognition to convert vocal option selections or digital user inputs representing option selections into IVR trees. IVR tree generation module 210 may generate IVR trees with a root node associated with IVR access point and leave nodes associated with option selections. IVR tree generation module 210 may then communicate generated IVR trees to comparison module 220.

Comparison module 220 may receive IVR trees and associates option selections from IVR tree generation module 210. Comparison module 220 may determine if any leave nodes, associated with option selections, from the received trees are unique. A unique leave node may be represented by a leaf node in an IVR tree that is not contained in any other received IVR tree or IVR trees saved in memory in a data store. Comparison module 220 may communicate unique leaf nodes to may be communicated IVR tree generation module 210. IVR tree generation module 210 may generate an IVR combination tree based on the received IVR trees from receiving module 200 and leaf nodes received from comparison module 220. A combination IVR tree may represents unique option selections made by multiple users and the combination tree. In various embodiments, after a number of user option selections are received all target services may be encompassed in the generated IVR combination tree. IVR tree generation module 210 may communicate the IVR combination tree to display module 230 for display to a user.

In various embodiments, display module 230 may communicate the IVR combination tree to client device 120 via network 140. The IVR combination tree may contain leaf nodes associated with one or more target services. Display module 230 may make user selectable target services available to client device 120. Display module 230 may receive a user selection associated with a displayed selectable target service associated with a leaf node of the IVR combination tree. Display module 230 may communicate with IVR system 130 via server 110 to execute the user selected target service.

Figure 3:
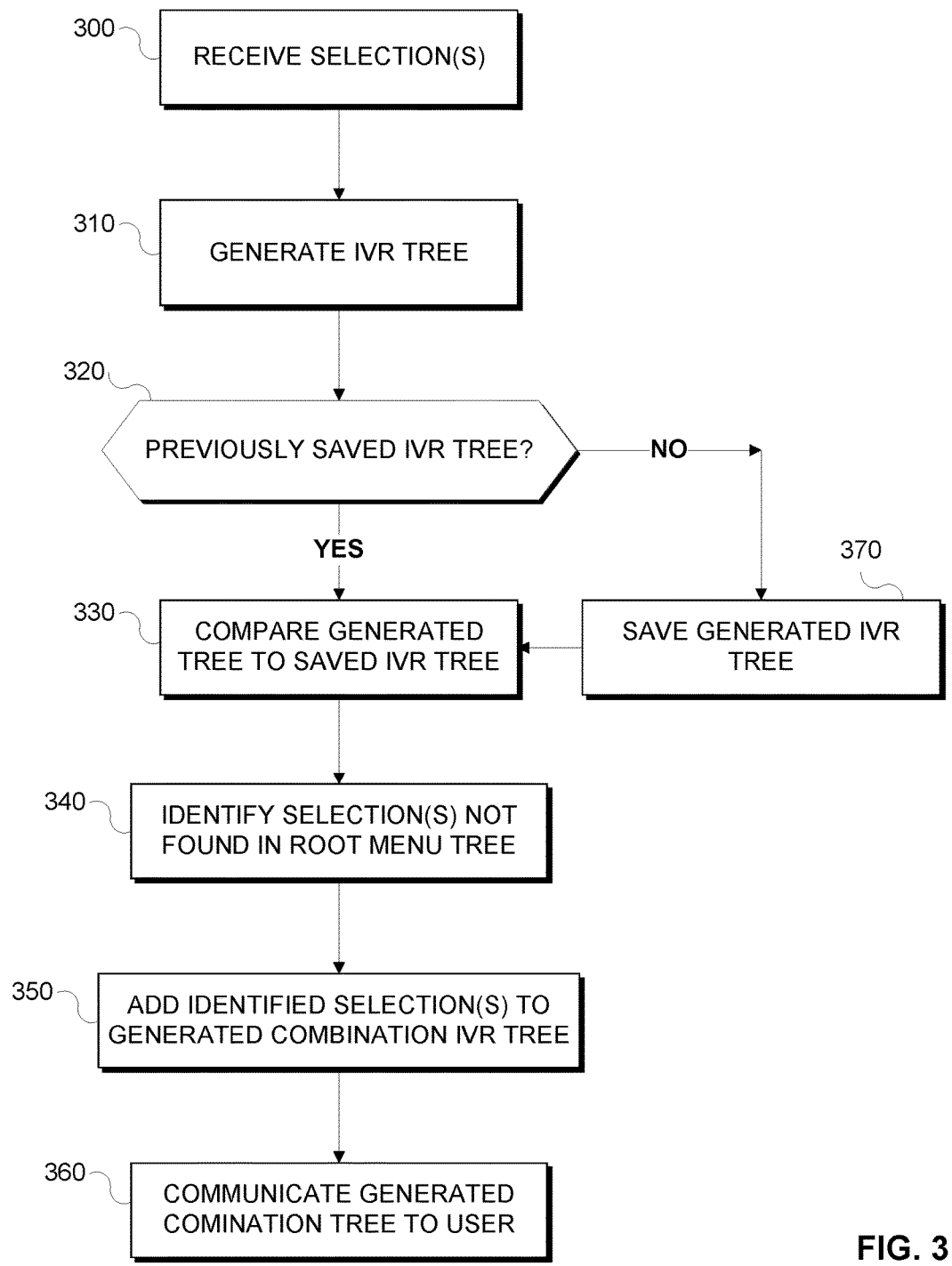
FIG. 3 is a flowchart depicting operational steps of the application, on a server computer within the data processing environment of FIG. 1, in accordance with an embodiment of the present invention.

FIG. 3 is a flowchart depicting operational steps of the function IVR application 111, according to an embodiment of the present invention. Receiving module 200 receives a plurality of user selections, in step 300, from a user device, for example client device 120, via IVR system 130. For example a user may interact with IVR system 130 to make option selections and/or target service selections, which may be analyzed by a natural language processing (NLP) within the IVR system, for example IVR system 130, and then relayed by IVR system 130 to IVR application 111 via network 140.

In various embodiments, a user may set up a user profile, described in more detail below, and make selections from a graphical user interface (GUI), for example, via a web browser, where the visual representations of the option selections or target services are based on previously generated IVR combination trees associated with the user profile, described in further below. User selections of visual representations of selectin options and/or target services may be received by receiving module 200, from client device 120, via network 140. Option selections received by receiving module 200 may be communicated to IVR tree generation module 210 via IVR application 111.

Receiving module 200 communicates the received plurality of user selections to IVR tree generation module 210. IVR tree generation module 210 generates an IVR tree, in step 310, based on the received option selections. The generated IVR tree may include IVR system option selections, which include at least a root node or access option, a set of subtrees associated with the root node that include additional option selections or leaf nodes, and an end node associated with a target service option of the plurality of target service options made available by IVR system 130. A root node or access option may be the department or company first accessed by a user, for example, accessing the IVR system of a bank and selecting "account services". A leaf node or option selections may be additional menu options that lead to a target service, for example, after "account services" selection is made "money transfer" may be selected, then "from savings to checking". The end node or target service may be the actual service the user desires to execute, for example, "transfer $200 from savings to checking today". In various embodiments, a generated IVR tree may contain a root node, a root node and an end node, or a root node, one or more leaf nodes, and an end node.

IVR tree generation module 210 communicates the generated IVR trees to comparison module 220. Comparison module 220 determines if there are any saved IVR trees in memory. In response to comparison module 220 determining no saved IVR trees are in memory, in decision step 320 "NO" branch, comparison module 220 saves the received IVR tree(s) in memory in a data store, in step 370.

In response to identifying previously saved IVR trees, comparison module 220 compares the received IVR trees with the IVR trees in memory, in step 330. Comparisons, for example, may be performed by comparing received selections from two trees to determine differences, or option selections that are unique to, the saved IVR tree. In various embodiments, a unique option section or node may be a received option selection that has not yet been previously received and stored in memory, or any received option selection different to any received IVR tree or IVR trees saved in memory in a data store.

Comparison module 220 identifies option selections that are unique, in step 340, and comparison module 220 communicates the identified unique option selections back to IVR tree generation module 210. IVR tree generation module 210 generates an IVR combination tree, in step 350, based on the identified unique option selections. In various embodiments with no previously saved IVR trees the IVR combination tree may be the same as the received IVR tree described above. In various embodiments, unique option selections will be added to a previously saved IVR tree to generate an IVR combination tree. It should be appreciated by those in the art that this process may occur repeatedly such that the combination tree starts with only a few nodes, and with the addition of nodes based on identified unique option selections, increase to encompass all of the option selections contained in the IVR system 130. In various embodiments, multiple nodes may be added to a queue and added to the IVR combination tree by IVR generation module 210 in various orders (FIFO, FILO, LILO, LIFO, etc.). In various embodiments, IVR tree generation module 210 generates an IVR combination tree by combining all identified unique option selections to the same root node as described in further detail below.

In various embodiments, IVR tree generation module 210 generates a new IVR combination tree based on the initially saved generated IVR combination tree, where the saved generated IVR combination tree is updated with additional identified unique option selections received from a plurality of users. IVR tree generation module 210 communicates the generated IVR combination tree to display module 230 for display to a user via client device 120, in step 360.

FIG. 4A and FIG. 4B are block diagrams depicting an exemplary generated IVR trees based on different interactions by various users with IVR system 130. In FIG. 4A IVR application 111 may generate IVR trees based on selection options and target services received from four users: User 1; User 2; User 3; and User 4. Users 1, 2, 3, and 4 may, for example, access IVR system 130 through the same root node but have different IVR trees generated based on different desired target service and the respective option selections needed to navigate to that target service. For example, User 1 may have a target service of A3, and need to navigate through options A1 and A2 to reach target service A3. Likewise, User 2 may have a target service of B3. User 3 may have a target service of C3. However, User 4 may access the same root node but have a target service of C4. Selections A1, A2, B1, B2, C1, and C2 are the option selections needed to access the target service of User 1, User 2, User 3, and User 4 respectively. IVR application 111 may compare trees 400, 410, 420, 430 and determine the option selections A1, A2, A3, B1, B2, B3, C3, and C4 are unique option selections. Since C1 and C2 occur in IVR trees from User 3 and User 4 so, for example, only one C1 and one C2 are considered unique and added to the generated IVR combination tree as in FIG. 4B. All identified unique option selections are combine into IVR combination tree 440 as seen in FIG. 4B. In FIG. 4B, an exemplary IVR combination tree 440 is shown. The IVR combination tree 440 is generated based on the common root in trees 400, 410, 420, 430 and the unique option selections, or unique leaf nodes of trees 400, 410, 420, and 430.

In various embodiments a plurality of additional users may access IVR system 130 via client device 120 and IVR application 111 may receive a plurality of additional option selections and generate a plurality of additional IVR trees based on the received plurality of option selections. For example, if IVR application 111 receives option selections from User 5 (not shown) and generates an IVR tree that includes menu option selections A1, A4, and target service A5. IVR combination tree 440 may be updated by IVR application 111 to include a node A4 coming off of node A1 and a target service A5 coming off of node A4 (not shown).

Figure 5:
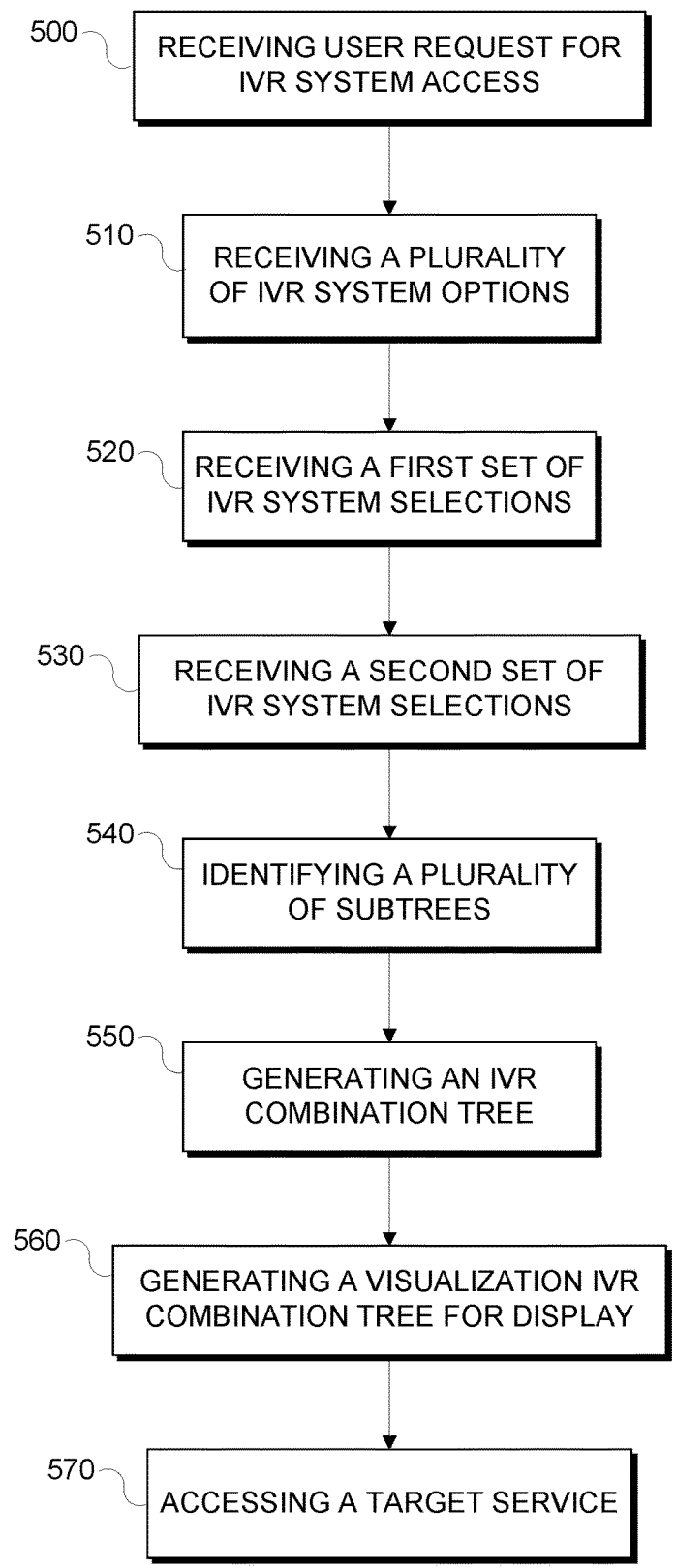
FIG. 5 is a flowchart depicting the operational steps of the application, on a server computer within the data processing environment of FIG. 1, in accordance with an additional embodiment of the present invention.

FIG. 5 is a flowchart depicting operational steps of an exemplary alternative embodiment involving a first and second set of option selections or IVR system selections, according to an embodiments of the present invention. Receiving module 200 receives a user request for IVR system access, from client device 120, via server 110. In various embodiments, receiving module 200 receives, from a server, for example server 110, a user request for access to an IVR system, for example IVR system 130, in step 500. Receiving module 200 receives a plurality of IVR system options from the IVR system, in step 510. Receiving module 200 communicates plurality of IVR system options to the user, wherein the IVR system options include a category option and a plurality of target service options associated with the access option.

Receiving module 200 receives a first set of selections of the IVR system options from the user, in step 520, wherein the IVR system options includes an option tree, an option tree includes at least a root node, a set of subtrees associated with the root node, and an end node, or leaf node associated with a target service option of the plurality of target service options.

Receiving module 200 receives a second set of selections of the IVR system comprising at least a second set of subtrees, in step 530. In response to identifying a plurality of subtrees of the second set of subtrees that are associated with the root node, in step 540, receiving module 200 maps the identified plurality of subtrees to the option tree.

IVR tree generation module 210 generated an IVR combination tree, in step 550, wherein the generated IVR combination tree comprises at one or more of the first set of subtrees and identified plurality of subtrees IVR tree generation module 210 generated a visualization IVR combination tree for display by display module 230, in step 560, in response to receiving a second user request for access to the IVR system. Display module 230 accessed a target service associated with a user input selection of at least one end node of the visualized IVR combination tree, in step 570.

In various embodiments of the present invention, receiving module 200 receives user input through voice recognition software. Therefore, in IVR trees and options generated for display to a user may be based on the selection based on voice recognition.

In various embodiments, display module 230 may communicate an IVR combination tree to a user via client device 120 in response to a user profile generation and login request. Receiving module 200 may receive an authentication request associated with a user profile stored in memory. It should be appreciated that the user profile may be generated and stored in memory on server 110 using any method known in the art. Display module 230 may communicate an IVR combination tree, for example IVR combination tree 440, in FIG. 4, to the user via a user device, for example, a GUI displayed on client device 120. The user may make a target service selection from a visualization of IVR combination tree 440 and communicate the target service selection to be executed by IVR system 130. The specific target service selected may be stored in memory as a count of target services selected for later processing.

In various embodiments, target services associated with the user profile may be assigned a count based on the number of times the target service was selected by that particular user as recorded in the user profile. In various embodiments, target services with a count above a threshold may be communicated for display to the user by display module 230. A user may select a target service from the list of displayed target services and communicate the selected target service to IVR system 130 for execution of the selected target service.

Figure 6:
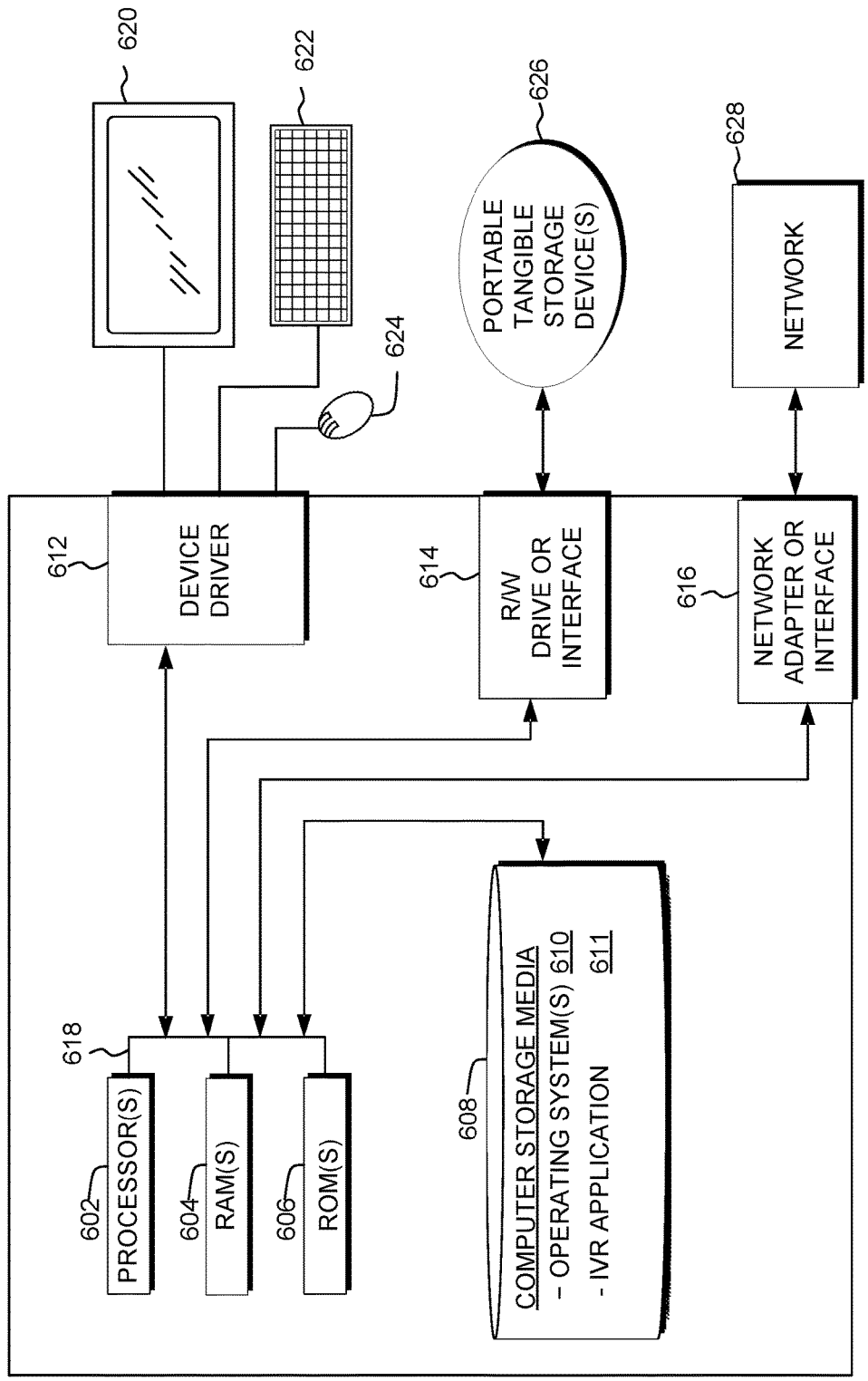
FIG. 6 depicts a block diagram of components of the server computer executing the ingestion application, in accordance with an embodiment of the present invention.

FIG. 6 depicts a block diagram of components of Server 110 of distributed data processing environment 100 of FIG. 1, in accordance with an embodiment of the present invention. It should be appreciated that FIG. 6 provides only an illustration of one implementation and does not imply any limitations with regard to the environments in which different embodiments may be implemented. Many modifications to the depicted environment may be made.

Server 110 may include one or more processors 602, one or more computer-readable RAMs 604, one or more computer-readable ROMs 606, one or more computer readable storage media 608, device drivers 612, read/write drive or interface 614, network adapter or interface 616, all interconnected over a communications fabric 618. Communications fabric 618 may be implemented with any architecture designed for passing data and/or control information between processors (such as microprocessors, communications and network processors, etc.), system memory, peripheral devices, and any other hardware components within a system.

One or more operating systems 610, and one or more application programs 611, for example, IVR application 111, are stored on one or more of the computer readable storage media 608 for execution by one or more of the processors 602 via one or more of the respective RAMs 604 (which typically include cache memory). In the illustrated embodiment, each of the computer readable storage media 608 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Server 110 may also include a R/W drive or interface 614 to read from and write to one or more portable computer readable storage media 626. Application programs 611 on Server 110 may be stored on one or more of the portable computer readable storage media 626, read via the respective R/W drive or interface 614 and loaded into the respective computer readable storage media 608.

Server 110 may also include a network adapter or interface 616, such as a TCP/IP adapter card or wireless communication adapter (such as a 4G wireless communication adapter using OFDMA technology) for connection to a network 628. Application programs 611 on Server 110 may be downloaded to the computing device from an external computer or external storage device via a network (for example, the Internet, a local area network or other wide area network or wireless network) and network adapter or interface 616. From the network adapter or interface 616, the programs may be loaded onto computer readable storage media 608. The network may comprise copper wires, optical fibers, wireless transmission, routers, firewalls, switches, gateway computers and/or edge servers.

Server 110 may also include a display screen 620, a keyboard or keypad 622, and a computer mouse or touchpad 624. Device drivers 612 interface to display screen 620 for imaging, to keyboard or keypad 622, to computer mouse or touchpad 624, and/or to display screen 620 for pressure sensing of alphanumeric character entry and user selections. The device drivers 612, R/W drive or interface 614 and network adapter or interface 616 may comprise hardware and software (stored on computer readable storage media 608 and/or ROM 606).

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A computer implemented method for generating an Interactive Voice Response (IVR) system tree, comprising:
   receiving, by a server, a user request for access to an IVR system;
   receiving a first set of selections of IVR system options from the user, wherein the first set of selections includes a plurality of IVR system options from the IVR system,
   generating a first set of subtrees, based on voice recognition of the first set of selections, wherein the first set of subtrees includes at least a root node, a set of selection nodes associated with the root node, and an end node associated with a target service option of a plurality of target service options of the IVR system;
   in response to receiving a second set of selections of the IVR system, generating a second set of subtrees, based on voice recognition of the second set of selections;
   in response to identifying a plurality of subtrees of the second set of subtrees that are associated with the root node, mapping the identified plurality of subtrees to the root node;
   generating an IVR combination tree, wherein the generated IVR combination tree comprises at one or more of the first set of subtrees and identified plurality of subtrees;
   receiving a third set of selections of the IVR system comprising at least a third set of subtrees;
   generating a third set of subtrees based on voice recognition of the second set of selections;
   in response to dynamically determining one or more selections of the third set of selections of the option tree do not match selection nodes of the generated IVR combination tree, generating an updated IVR combination tree based on the dynamically determined one or more selections and generated IVR combination tree;
   generating a visualization IVR combination tree for display, in response to receiving a second user request for access to the IVR system; and
   accessing a target service associated with a user input selection of at least one end node of the visualized IVR combination tree.

2. The method of claim 1, wherein received selections further comprise one or more of vocal selection and touchpad user inputs selection.

3. The method of claim 1, further comprising:
   displaying one or more target selections based on a count above a threshold associated with the one or more target selections.

4. The method of claim 1, further comprising:
   in response to receiving authentication metadata associated with a user profile, displaying one or more target services based on the received metadata.

5. The method of claim 1, further comprising:
   determining an access count value of each target services accessed by a user;
   ordering the target services based on the associated access count value; and
   displaying target services with a count above a threshold.

6. A computer program product for generating an Interactive Voice Response (IVR) system tree, the computer program product comprising:

one or more non-transitory computer-readable storage media and program instructions stored on the one or more computer-readable storage media, the program instructions comprising:
instructions to receive by a server, a user request for access to an IVR system;
instructions to receive a first set of selections of the IVR system options from the user, wherein the first set of selections includes a plurality of IVR system options from the IVR system,
instructions to generate a first set of subtrees, based on voice recognition of the first set of selections, wherein the first set of subtrees includes at least a root node, a set of selection nodes associated with the root node, and an end node associated with a target service option of the plurality of target service options of the IVR system;
in response to instructions to receive a second set of selections of the IVR system, generating a second set of subtrees, based on voice recognition of the second set of selections;
in response to instructions to identify a plurality of subtrees of the second set of subtrees that are associated with the root node, instructions to map the identified plurality of subtrees to the root node;
instructions to generate an IVR combination tree, wherein the generated IVR combination tree comprises at one or more of the first set of subtrees and identified plurality of subtrees;
instructions to receive a third set of selections of the IVR system comprising at least a third set of subtrees;
instructions to generate a third set of subtrees based on voice recognition of the second set of selections;
in response to instructions to dynamically determine one or more selections of the third set of selections of the option tree do not match selection nodes of the generated IVR combination tree, instructions to generate an updated IVR combination tree based on the dynamically determined one or more selections and generated IVR combination tree;
instructions to generate a visualization IVR combination tree for display, in response to instructions to receive a second user request for access to the IVR system; and
instructions to access a target service associated with a user input selection of at least one end node of the visualized IVR combination tree.

7. The computer program product of claim 6, wherein received selections further comprise one or more of vocal selection and touchpad user inputs selection.

8. The computer program product of claim 6, further comprising:
displaying one or more target selections based on a count above a threshold associated with the one or more target selections.

9. The computer program product of claim 6, further comprising:
in response to receiving authentication metadata associated with a user profile, displaying one or more target services based on the received metadata.

10. The computer program product of claim 6, further comprising:
determining an access count value of each target services accessed by a user;
ordering the target services based on the associated access count value; and
displaying target services with a count above a threshold.

11. A computer system for generating an Interactive Voice Response (IVR) system tree, the computer system comprising:
one or more computer processors;
one or more computer-readable storage media;
program instructions stored on the computer-readable storage media for execution by at least one of the one or more processors, the program instructions comprising:
instructions to receive by a server, a user request for access to an IVR system;
instructions to receive a first set of selections of the IVR system options from the user, wherein the first set of selections includes a plurality of IVR system options from the IVR system,
instructions to generate a first set of subtrees, based on voice recognition of the first set of selections, wherein the first set of subtrees includes at least a root node, a set of selection nodes associated with the root node, and an end node associated with a target service option of the plurality of target service options of the IVR system;
in response to instructions to receive a second set of selections of the IVR system, generating a second set of subtrees, based on voice recognition of the second set of selections;
in response to instructions to identify a plurality of subtrees of the second set of subtrees that are associated with the root node, instructions to map the identified plurality of subtrees to the root node;
instructions to generate an IVR combination tree, wherein the generated IVR combination tree comprises at one or more of the first set of subtrees and identified plurality of subtrees;
instructions to receive a third set of selections of the IVR system comprising at least a third set of subtrees;
instructions to generate a third set of subtrees based on voice recognition of the second set of selections;
in response to instructions to dynamically determine one or more selections of the third set of selections of the option tree do not match selection nodes of the generated IVR combination tree, instructions to generate an updated IVR combination tree based on the dynamically determined one or more selections and generated IVR combination tree;
instructions to generate a visualization IVR combination tree for display, in response to instructions to receive a second user request for access to the IVR system; and
instructions to access a target service associated with a user input selection of at least one end node of the visualized IVR combination tree.

12. The system of claim 11, wherein received selections further comprise one or more of vocal selection and touchpad user inputs selection.

13. The system of claim 11, further comprising:
displaying one or more target selections based on a count above a threshold associated with the one or more target selections.

14. The system of claim 11, further comprising:
in response to receiving authentication metadata associated with a user profile, displaying one or more target services based on the received metadata.

* * * * *